United States Patent [19]
Pews et al.

[11] 3,879,387

[45] Apr. 22, 1975

[54] PROCESS FOR THE PREPARATION OF PYRIDYL ISOCYANURATES

[75] Inventors: Richard Garth Pews; Lennon H. McKendry, both of Midland, Mich.; Ralph M. Rodia, Salem, Oreg.

[73] Assignee: The Dow Chemical Company, Midland, Mich.

[22] Filed: Nov. 1, 1973

[21] Appl. No.: 411,937

Related U.S. Application Data

[60] Division of Ser. No. 285,503, Aug. 31, 1972, Pat. No. 3,804,844, and a continuation-in-part of Ser. No. 94,622, Dec. 2, 1970.

[52] U.S. Cl.................... 260/248 NS; 260/294.8 R; 260/294.8 F; 260/294.8 G; 260/295 CA; 260/296 R; 260/471 C; 424/263; 424/249
[51] Int. Cl.............................................. C07d 55/38
[58] Field of Search... 260/294.8 F, 295 CA, 296 R, 260/248 NS, 471 C

[56] References Cited
UNITED STATES PATENTS

| | | | |
|---|---|---|---|
| 3,584,028 | 6/1971 | Argabright et al............ | 260/248 NS |
| 3,773,695 | 11/1973 | Argabright et al............ | 260/248 NS |

*Primary Examiner*—Alan L. Rotman
*Attorney, Agent, or Firm*—Gary D. Street

[57] ABSTRACT

There is disclosed herein a process for the preparation of aromatic amines and carbamates by reacting certain carbocyclic and heterocyclic aromatic compounds, ring-substituted with at least one displaceable substituent, with alkali metal cyanates and water or an alkanol in the presence of a high dielectric-aprotic solvent.

5 Claims, No Drawings

PROCESS FOR THE PREPARATION OF PYRIDYL ISOCYANURATES

CROSS-REFERENCE TO RELATED APPLICATION

This is a division of application Ser. No. 285,503, filed Aug. 31, 1972, now U.S. Pat. No. 3,804,844, and a continuation-in-part of our co-pending application, Ser. No. 94,622, filed Dec. 2, 1970.

BACKGROUND OF THE INVENTION

The present invention pertains to a new method for preparing aromatic amines and carbamates by reacting certain ring-substituted aromatic carbocyclic and heterocyclic compounds with alkali metal cyanates and water or an alkanol.

Various methods for preparing certain organic isocyanate-based derivatives are disclosed in the art. It is generally known that certain organic isocyanate intermediates are prepared by the reaction of phosgene with amines, or by the rearrangement of appropriate acyl azides. The preparation of organic isocyanates by the reaction of aralkyl and aralkenyl halides, such as benzyl chloride and xylylene dichloride, with alkali metal cyanates in the presence of quaternary ammonium halides or tertiary amines is also known. See U.S. Pat. Nos. 2,866,802 and 2,866,803. The reaction of similar organic halides with alkali cyanates to form isocyanates is also known in the art. Generally, the reactive halide is present on an aliphatic carbon atom having at least one hydrogen atom on the halogen-substituted atom. See, for example, U.S. Pat. Nos. 2,536,849; 2,866,801; and 3,584,028.

It has now been discovered that aromatic ring-substituted isocyanate-based derivatives can be prepared from various ring-substituted aromatic carbocyclic and heterocyclic compounds; furthermore, the process can be carried out without prior or separate reduction to a corresponding amine.

SUMMARY OF THE INVENTION

According to the present invention, it has been discovered that carbocyclic and heterocyclic aromatic amines and carbamates, hereinafter termed "isocyanate-based compounds", can be prepared by reacting certain carbocyclic and heterocyclic aromatic compounds, ring-substituted with at least one displaceable substituent, with alkali metal cyanates and water or an alkanol in the presence of a high dielectric-aprotic solvent. Other isocyanate-based compounds, such as for example, aromatic isocyanurates, are prepared in similar methods wherein aromatic carbocyclic or heterocyclic compounds, ring-substituted with at least one displaceable substituent, are reacted with alakali metal cyanates in the presence of a high dielectric-aprotic solvent.

The process of the present invention is generally applicable to carbocyclic or heterocyclic aromatic compounds (hereinafter "aromatic compounds") ring-substituted with at least one substituent subject to nucleophilic displacement by a cyanate ion nucleophile. Such aromatic compounds can be ring-substituted with more than one identical or different displaceable substituents which can be of the same or of varying degrees of nucleophilic reactivity with a cyanate ion nucleophile. Furthermore, the aromatic compounds can contain one or more non-displaceable substituents, i.e., not displaceable by a cyanate ion nucleophile, as long as at least one ring-substituted displaceable substituent is present. Such isocyanate-based derivatives have estbalished utility in a variety of applications such as, for example, bonding agents, pesticides, additives or modifiers in polymers to increase fire retardancy and water repellancy, and the like. Other uses will be evident to those skilled in the art.

DETAILED DESCRIPTION OF THE INVENTION

Examples of specific aromatic compounds which, when ring-substituted with at least one displaceable substituent, are useful in the present process include, for example, benzene, pyridine, pyrimidine, pyrazine, pyran, quinoxaline, indazole, furan, pyrrole, thiophene, imidazole, oxazole, isoxazole, and the like. Of these, benzene, pyridine, pyrimidine, pyrazine, pyran, quinoxaline, and indazole constitute a preferred class. A preferred sub-class of compounds within this invention are benzene, pyridine, pyrimidine and pyrazine. Within this preferred sub-class especially preferred are benzene and pyridine. Substituents which are subject to nucleophilic displacement by a cyanate ion nucleophile and which can be ring-substituted on the above aromatic compounds include chloro, bromo, fluoro, iodo, $N_2^+$, $-OSO_2R$, $-SO_2R$, or $-SR_2^+$, wherein each R independently represents hydrogen, phenyl or a loweralkyl radical of from 1 to about 4 carbon atoms, inclusive.

The following definitions will aid in the understanding of the disclosed invention. The term "aprotic solvent" means a solvent which does not yield a proton to the solute(s) under reaction conditions. For purposes of this invention, "high dielectric" refers to compounds having a dielectric constant equal to or higher than diglyme, otherwise known as "diethyleneglycol dimethyl ether". The term "loweralkyl" as used in the present specification and claims, means saturated, monovalent aliphatic radicals, including straight and branched-chain radicals of from one to about 4 carbon atoms, as illustrated by, but not limited to, methyl, ethyl, propyl, isopropyl, butyl sec.-butyl, and the like.

The alkali metal cyanates which can be employed in the present invention include those of lithium, sodium, potassium, and cesium; preferably sodium and potassium cyanate are employed. Normally, it is advantageous to employ from about 10 to about 50% equivalent excess of alkali metal cyanate.

The high dielectric-aprotic solvents useful in this invention include acetonitrile, dimethylssulfoxide, dimethyl formamide, diglyme (otherwise known as diethyleneglycol dimethyl ether), monoglyme (otherwise known as 1,2-dimethoxyethane), acetone, methyl ethyl ketone, dioxane, tetrahydrofuran, N-methylpyrrolidone, and the like. Of these solvents, acetonitrile and N-methylpyrrolidone are especially preferred. Representative alkanols suitable for use in the present invention are those containing from 1 to about 4 carbon atoms, including methanol, ethanol, propanol, iso-propanol, butanol, and the like.

In carrying out the process of the present invention, the aromatic ring-substituted compound and alkali metal cyanate contacted in the presence of a high dielectric-aprotic solvent. Water or an alkanol is added and the resulting reaction mixture is heated for a sufficient period of time to allow for substantial completion of the reaction. The isocyanate-based compound obtained upon the addition of water alone is the corresponding aromatic amine, whereas the aromatic carbamate is obtained upon the addition of an alkanol only. Mixtures of the amine and carbamate compounds are obtained upon the addition of both water and alkanol. In each instance, the aromatic amine and carbamate products are derived from a common isocyanate intermediate. In alternative operations, the water or alkanol can be added to the reaction mixture following the initial heating of the aromatic compound and alkali metal cyanate reactant. Where it is desired to produce other isocyanate-based compounds, such as, for example, aromatic isocyanurates, the addition of water or an alkanol is omitted.

The temperature at which the reaction is carried out is dependent upon the raw material reactants and solvent employed. Generally, the reaction temperature ranges from about 20° to about 200°C.; preferably, the reaction is carried out at the boiling temperature of the reaction mixture under reflux conditions. Similarly, the reaction time, which ranges from about one hour to 4 or 5 days, varies inversely with the reaction temperature. Ambient pressures are adequate at the reaction temperature employed when the volatility of the aromatic reactant, alcohol, and solvent permit; many reactions of the invention can be carried out at atmospheric pressure.

To further illustrate the process of the present invention, the following examples are provided. It should be understood that the details thereof are not to be regarded as limitations, as they may be varied as will be understood by one skilled in the art.

EXAMPLE 1

A reaction mixture consisting of 2,4-dinitrochlorobenzene (25.0 grams; 0.123 mole), potassium cyanate (12.0 grams; 0.184 mole), 7.5 milliliters of methanol and 50 milliliters of acetonitrile was heated with agitation at the boiling point of the mixture under reflux conditions for a period of about 5 days. Following the reaction period, the reaction mixture was filtered while hot to remove solid by-products and the filtrate was cooled to about −10°C. The red precipitate formed upon cooling of the filtrate was removed by filtration and dissolved in chloroform to give a yellow solution containing a red solid. The solution was filtered and the filtrate concentrated to dryness by evaporation under reduced pressure. The residue thus obtained was purified by exposure to column chromatography using chloroform as the eluent and activated alumina as an adsorbent, and by subsequent recrystallization from carbon tetrachloride. As a result of these operations, the desired methyl 2,4-dinitrocarbanilate product was obtained as a crystalline solid melting at 127° to 127.5°C.

EXAMPLE 2

A reaction mixture consisting of 4-methylsulfonyl-2,3,5,6-tetrachloropyridine (25.0 grams; 0.085 mole), sodium cyanate (7.0 grams; 0.14 mole), 8.0 milliliters of methanol and 100 milliliters of acetonitrile was heated with agitation, at the boiling temperature under reflux conditions for a period of 3 days. Following the reaction period, the reaction mixture was filtered while hot to remove solid by-products, and the filtrate was cooled to about −10°C. The yellow precipitate formed upon cooling of the filtrate was removed by filtration and recrystallized from a solution of hot carbon tetrachloride. As a result of these operations, the desired m-ethyl-2,3,5,6-tetrachloro-4-pyridinecarbamate product was obtained as a crystalline solid melting at 181°–181.5°C. Elemental analysis calculated for $C_7H_4Cl_4N_2O_2$ (percent): C, 28.9; H, 1.38; Cl, 48.9; N, 9.66. Found (percent): C, 29.1; H, 1.43; Cl, 48.5; N, 9.82.

EXAMPLE 3

4-Methylsulfonyl-2,3,5,6-tetrachloropyridine (5.0 grams; 0.017 mole), potassium cyanate (2.0 grams; 0.03 mole), 20.0 milliliters of acetonitrile and 2.0 milliliters of methanol were mixed in a glass pressure cell. The glass cell was placed in an oil bath and the reaction mixture was heated at a temperature of from about 100° to about 125°C. for a period of one hour. Following the reaction period, the reaction mixture was filtered while hot to remove solid by-products and the filtrate was cooled to about minus 10°C. The precipitate formed upon cooling of the filtrate was filtered off and treated as in Example 2. The crystalline solid was identified as methyl 2,3,5,6-tetrachloropyridine carbamate, melting at 181°–181.5°C.

EXAMPLE 4

A reaction mixture consisting of pentachloropyridine (20.0 grams; 0.079 mole), sodium cyanate (20.0 grams; 0.4 mole) and 250 milliliters of N-methylpyrrolidone were heated at a temperature of about 135° for a period of about 3 hours with agitation under the pressure of nitrogen. Following the reaction period, the N-methylpyrrolidone was removed from the reaction mixture by distillation at 0.5 mm of pressure at a temperature of 80°C. The reaction mixture was cooled and 25 milliliters of ethanol, followed by 200 milliliters of water, was added. The resultant suspension was extracted with methylene chloride and dried; the solvent was removed from the extract by evaporation under reduced pressure. Chromatography of the residue on silica gel gave 4-amino-tetrachloropyridine, identical with authentic samples, and ethyl 2,3,5,6-tetrachloropyridine carbamate melting at 178°–179°C.

EXAMPLE 5

Pentachloropyridine (20.0 grams; 0.07 mole) was dissolved in 250 milliliters of N-methylpyrrolidone containing sodium cyanate (20 grams; 0.4 mole). The resulting reaction mixture was heated at 135°–140°C. in an atmosphere of nitrogen for a period of about 3 hours. Following the reaction period, the N-methylpyrrolidone was removed by vacuum distillation over a period of about 2 hours. The dark brown residue thus obtained was treated with 200 milliliters of water and the resultant suspension filtered to obtain a tan solid material which was crystallized and recrystallized from a $CHCl_3$-hexane mixture. As a result of these operations, the desired 4-amino-tetrachloropyridine compound, identical with authentic samples, was obtained as a yellow crystalline solid.

EXAMPLE 6

A reaction mixture consisting of 4-methylsulfonyl-2,3,5,6-tetrachloropyridine (25.0 grams; 0.085 mole), potassium cyanate (10.3 grams; 0.127 mole), and 60 milliliters of acetonitrile was heated with agitation at the boiling temperature under reflux conditions for a period of about 20 hours. Following the reaction period, the reaction mixture was filtered while hot to remove a precipitate identified by infrared analysis to be a mixture of unreacted potassium cyanate and isocyanurate product. The solvent was removed from the filtrate by evaporation under reduced pressure and the oily residue thus obtained was solidified by the addition of chloroform. The solid precipitate formed upon addition of chloroform was obtained by filtration and suspended in ether. Subsequent acidification of the suspension with concentrated hydrochloric acid gave a solid precipitate which was filtered off. The filtrate was evaporated in vacuo leaving a solid residue which was recrystallized from refluxing acetonitrile. As a result of these operations, the di-(2,3,5,6-tetrachloro-4-pyridine) isocyanurate product was recovered as a crystalline solid melting at 338°–339°C.

What is claimed is:

1. A process for the preparation of a pyridine isocyanurate compound which comprises reacting a pyridine compound, ring-substituted with at least one displaceable substituent selected from the group consisting of chloro, bromo, fluoro, iodo, $-N_2^+$, $-OSO_2R$, $-SO_2R$, and $-SR_2^+$, wherein each R independently represents hydrogen, phenyl or a loweralkyl radical of from one to about 4 carbon atoms, inclusive, with an alkali metal cyanate in the presence of a high dielectric-aprotic solvent.

2. The process of claim 1 wherein the high dieletric-aprotic solvent is selected from the group consisting of acetonitrile, dimethyl sulfoxide, dimethyl formamide, diglyme, monoglyme, acetone, methyl ethyl ketone, dioxane, tetrahydrofuran and N-methylpyrrolidone, and wherein the alkali metal cyanate is selected from the group consisting of sodium, potassium, lithium and cesium.

3. The process of claim 1 wherein the reaction is carried out at a temperature of from about 20° to about 200°C.

4. The process of claim 1 wherein the reaction is carried out at the boiling temperature of the reaction mixture under reflux conditions.

5. The process of claim 1 which comprises reacting 4-methylsulfonyl-2,3,5,6-tetrachloropyridine with potassium cyanate in the presence of acetonitrile.

* * * * *